March 11, 1930.  P. BÖTTCHER, JR  1,750,384
METHOD OF AND APPARATUS FOR CUTTING TOOTHED GEARS
Filed March 18, 1927    5 Sheets-Sheet 1

Inventor:
P. Böttcher Jr.
By: Marks & Clark
Attys.

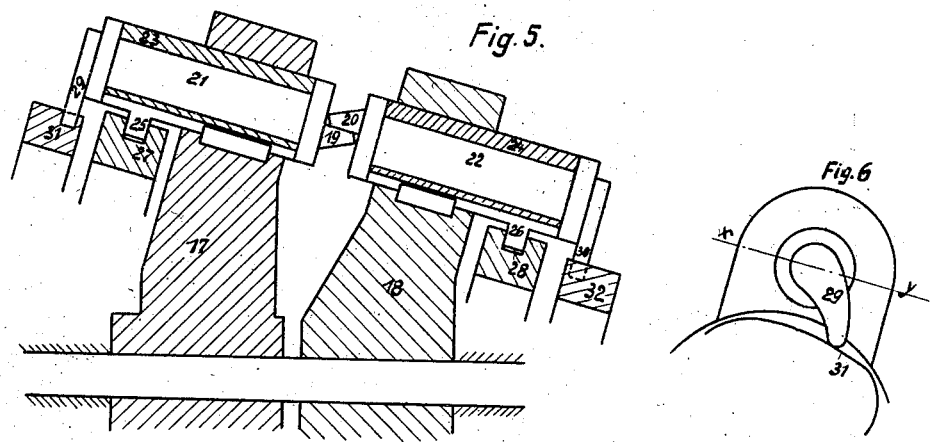

March 11, 1930.  P. BÖTTCHER, JR  1,750,384
METHOD OF AND APPARATUS FOR CUTTING TOOTHED GEARS
Filed March 18, 1927  5 Sheets-Sheet 4
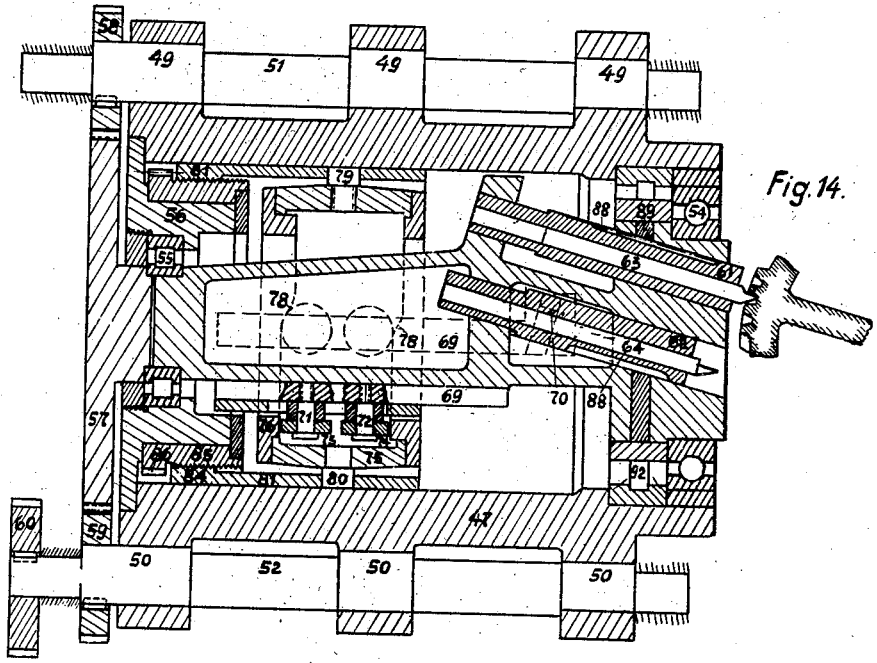
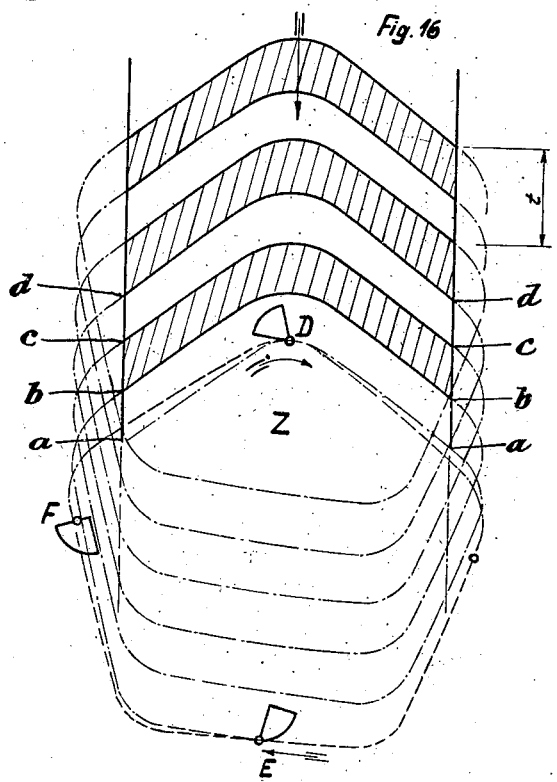
Inventor:
P. Böttcher Jr.
By: Marks & Clark
Attys.

March 11, 1930.  P. BÖTTCHER, JR  1,750,384
METHOD OF AND APPARATUS FOR CUTTING TOOTHED GEARS
Filed March 18, 1927   5 Sheets-Sheet 5

Inventor:
P. Böttcher Jr.

Patented Mar. 11, 1930

1,750,384

UNITED STATES PATENT OFFICE

PAUL BÖTTCHER, JR., OF ALTONA-BAHRENFELD, NEAR HAMBURG, GERMANY

METHOD OF AND APPARATUS FOR CUTTING TOOTHED GEARS

Application filed March 18, 1927, Serial No. 176,452, and in Germany March 20, 1926.

The present invention relates to a cutter tool head for use in machines for the production of curved tooth profiles in spur gear and bevel gear wheels in which one or each of several cutters is moved in the same or in a changeable direction by corresponding movement of the tool holder along the flanks of imaginary basic teeth, i. e. the teeth of an imaginary rack or crown wheel, whilst by corresponding rolling motion between the wheel blank and the cutter holder a gradual generation or shaping of the tooth flank is effected in the wheel blank to be cut according to the known rolling method. On account of its simplicity the basic idea of the invention is illustrated first of all in connection with the simplest form of curved or arcuate teeth, or so called circular teeth, the application of the invention to complicated forms of curved teeth being developed later. As the type of the wheel mounting, the adjusting motion between the wheel and the cutter holder as well as the rolling dividing movement in known machines of this type can be taken as invariable, and the novelty of the invention relates exclusively to the construction of the cutter head and the motions of the cutter holder, the following constructions are restricted to the details of this tool head.

All generating methods of gear cutting are based on the theory of the imaginary basic teeth, namely, an imaginary rack or crown wheel (for example, Bilgram's gear generating machine) according to which the tooth profiles are generated by the cutter in its movements.

According to this method of gear cutting different wheels can only correctly gear with one another if their associated imaginary basic teeth when superimposed correctly fit one another, making complete contact over all flank faces as if they were moulded or cast.

In the accompanying drawing Figs. 1 and 2 are a sectional elevation and a plan view respectively of the rolling method of gear cutting.

Figs. 5, 6 and 7 show diagrammatically a section, a side view and section line $x$—$y$ of Fig. 5 of two cutter heads.

Figs. 8 and 9 are views in section of bevel gear wheels.

Figs. 10, 11 and 12 are diagrammatic views illustrating the cutting action.

Fig. 14 is a section thereof and Fig. 15 is a detail section showing the cutter holders arranged parallel to the axis of the cutter head.

Figs. 16 and 17 are diagrammatic views of gear teeth.

Figure 1:
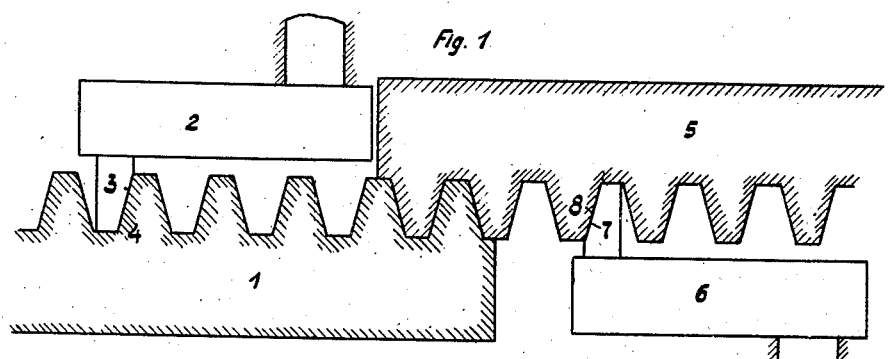
Figure 2:
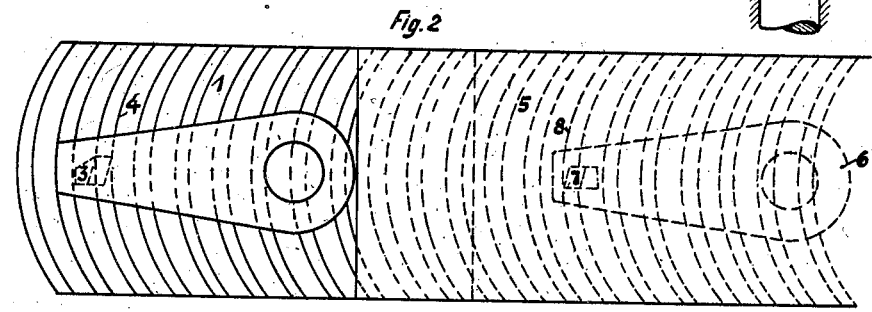

In order the better to explain these most important fundamentals for cutting each tooth profile by the rolling method two such imaginary basic tooth forms (racks) associated with two circular toothed gear wheels are shown applied to one another in Figure 1, which is a sectional elevation, and superimposed in Figure 2, which is a plan.

Above the rack 1 is shown diagrammatically a cutter head 2 provided with a cutter having a rectilinear inclined cutting edge 3, which generates a convex curved circular tooth flank 4. A similar cutter head 6 is shown in the usual manner below the rack 5, the rectilinear inclined cutting edge of the cutter of which generates a concave curved circular tooth flank 8. As shown in the figure the cutting edge 3 in the rotational movement of the cutter head generates a part of a convex conical surface whilst the cutting edge 7 generates a part of a concave conical surface. The convex tooth flank 4 of the rack 1 can only then exactly fit the concave tooth flank 8 of the rack 5, if the convex and concave conical surfaces of which they illustrate sections are exactly similar and their axes fully coincide upon superimposition. Therefrom the unconditional necessity arises that the cutting edge 3 of the cutter head 2 in the cutting of the teeth of one wheel blank, and the cutting edge 7 of the cutter head 6 during the cutting of the teeth of the counter wheel to gear therewith, should be arranged so that both generate exactly similar concave and convex conical surfaces, whilst the axes of rotation of the cutter heads must be perpendicular to the pitch plane of the basic teeth, or what is more important must be strictly parallel to one another.

Figure 3:
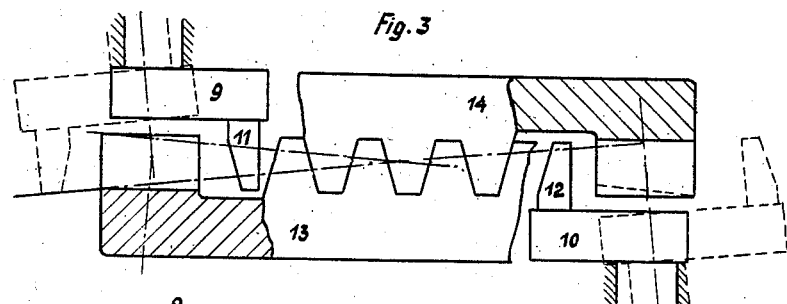
Fig. 3 is an elevation partly in section and Fig. 4 is a plan view of a bevel gear wheel.

The basic rule of proper engagement in cylindrical gear wheels applies also to bevel gear wheels where its exact observance meets with greater difficulties. Figure 3 which is an elevation partly in section and Figure 4 which is a plan show in a similar manner the relations in bevel gear wheels where the imaginary masher teeth (crown wheels) on which the teeth generation is based must when superimposed make complete contact as if moulded or cast. For the sake of simplicity it is first supposed that the teeth do not converge to the apex of an imaginary cone but that they are of uniform height as in cylindrical gear wheels. In this special case the circular motion of the cutting edge is effected parallel to the pitch plane of flat basic crown wheel. The axes of rotation of the cutter heads 9 and 10 are, therefore, both perpendicular to the pitch plane of the flat crown wheel. In consequence thereof the cutting edges 11 and 12 of the cutter heads 9 and 10 generate convex and concave tooth flanks 15, 16, of flat basic wheels 13 and 14, which fit exactly into one another when superimposed as in the case of the racks in Figures 1 and 2.

Difficulties arise as soon as the teeth, which are variable in the manner usual in bevel gear wheels, are given depths which vary according to the angle of the cone. In the use of the hitherto known single cutter head having fixed cutting tools it was not possible to position each cutter head so that it could be inclined to the angle of the tooth root or to the angle at which the tooth bottom to the pitch plane of the basic wheel as shown dotted in Fig. 3. Assuming superimposition of the imaginary crown wheels both cutter heads 9 and 10 are similarly inclined but in reverse directions. The axes of the convex and concave conical surfaces generated by their cutting edges no longer lie parallel but are inclined to one another at an angle approximately equal to the sum of both tooth root angles. The tooth flanks 15 and 16 of both crown wheels 13 and 14 associated with these conical surfaces no longer fit each other when superimposed and so a perfectly deep engagement of the conical surfaces in contact is impossible. For this reason it is not possible to cut bevel gears, which correctly mesh, by the generating method based on an imaginary crown wheel. All machines working according to this method produce tooth flanks which only approximately and imperfectly mesh with each other, as is confirmed by practice.

Figure 4:
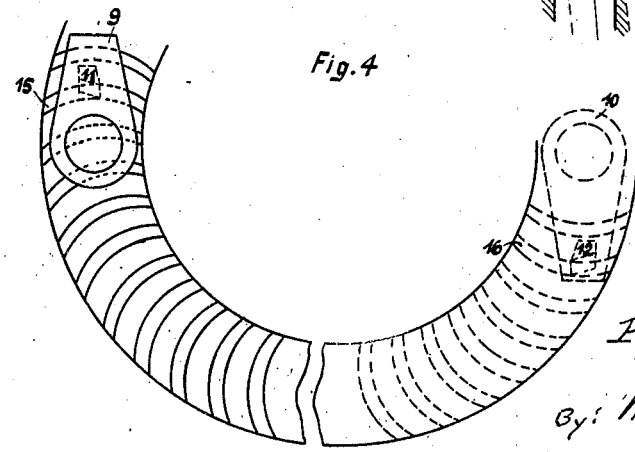

If it be desired to avoid this disadvantage the inclined position of the cutter head, the cause of the error, must be abandoned. The present invention considers the problem from quite a different aspect, and invariably retains for bevel gear wheels a position perpendicular to the pitch plane of the imaginary basic teeth as indicated in Figures 3 and 4, since according to previous statements conical surfaces completely fitting one another can only be generated under this condition. The straight line or rectilinear cutting edge on the cutter head in Figure 3 when imagined correspondingly produced cuts the axis of rotation of the cutter head. It shows, therefore, as already mentioned, together with its extension the generator of a conical surface of which it certainly generates, by reason of its restricted length, only a small section sufficient for the embodiment of the imagined basic teeth. Now in order to move the point of the cutting edge in a plane inclined according to the tooth root angle so as to be able to follow the guide line of the tooth base line rising gradually to the vertex of the cone without leaving the projecting fixed conical upper surface, the cutting edge according to the present invention is longitudinally displaced during the rotation of the cutter head, that is in the direction of the generator of the conical surface, the axis of rotation of the cutter head and also the imaginary apex of the conical surface remaining uninfluenced by this displacement. Should this displacement actually take place exactly in the direction of the cutting edge or of the generator of the conical surface then exactly the same conical surface is generated as before, but this section on the conical surface which is limited by the length of the cut actually used for the tooth generator appears somewhat displaced. This displacement of the tool-cut is effected in such manner that the cut at each stroke can no longer take place parallel to the pitch plane of the basic wheel during the rotational movement of the cutter head.

Figures 5, 6 and 7 show diagrammatically and respectively, a section, a side view and a section on the line X—Y of two such cutter heads. In these figures two cutter heads of the kind described are shown as they are used for the production of convex and concave arcuate tooth flanks adapted to fit one another. These two cutter heads are shown so superposed that their axes of rotation coincide and the solid and hollow conical surfaces generated by their cutting edges exactly coincide. The cutter heads 17, 18, carry shanks 21, 22, having cutting edges 19, 20. These shanks are supported in bushes 23, 24, ensured against axial displacement therein, the bushes being arranged axially displaceable in corresponding bores of the cutter heads 17, 18. This displaceability of the bushes 23, 24, together with the shanks 21, 22, in the cutter heads is controlled by projections 25, 26, which are guided during rotation of the cutter heads in correspondingly formed grooves 27, 28, secured to the machine frame.

As shown in Figure 5, the axes of the shanks 21, 22, and of the bushes 23, 24, are in exact alignment with the cutting edges 19, 20, or generators of the conical surfaces. The generated surfaces are therefore always sections of the same conical surfaces wholly independent of these axial displacements of the bushes 23, 24 during the rotation of the cutter heads. It is now possible to cut out any suitably shaped tooth base if the curved grooves 27, 28 for the axial displacement of the bushes 23, 24 be correspondingly formed without the necessity of altering in the slightest, the form and position of the conical surfaces themselves which exactly fit one another.

Assume, for example, it be a bevel gear wheel in which the lines of the tooth root are inclined to one another as indicated in dotted lines $F^1$, $F^2$ and $F^3$, $F^4$ in Figure 7, then a motion of the points of the steel cutters 19, 20 is possible along these inclined root lines, if during the rotation of the cutter heads the bushes 23, 24 and their projections 25, 26 are guided in the corresponding converging curved grooves 27, 28 and axially displaceable to one another in a direction in alignment with the cutting edges. The tooth gullet can be cut out just as well as any other, in straight or curved lines as soon as corresponding grooves 27, 28 are provided. This may become of considerable significance in spur gearing if by an arched tooth gullet less depth and consequently greater resistance of the teeth at the edges of the wheel is to be obtained.

This same displacement of the steel cutters in their heads can be simultaneously used in the direction of their own cuts without further alteration to prevent cutting in or pitting in those cases where in continuous rotational movement of the cutter head the cuts during the inoperative part of their circular path would cut into the wheel blank. Such a complete withdrawal of the bushes 23, 24 with the cutting edges 19, 20 at certain parts of the circular path is rendered possible by a corresponding formation of the grooves 27, 28. Should this withdrawal take place as indicated in the direction of the cutters themselves it is then practically proof against small constructional errors or faults. Small deviations in the readvance into the working position have no influence on the generated conical surface, because since the displacement within this conical surface is automatic it would at most influence the form of the cut out tooth gullet. For the correct co-operation of the wheels this is without significance.

The displaceability of the steel cutters in the direction of their cutting edges is of special advantage in those cases where they can be used as feed motions in the direction of the depth of the tooth spaces to be cut out. Such a feed motion of the steel cutters in the cutter heads is rendered possible if the guiding grooves 27, 28 are not rigid with the bearings but are arranged slowly displaceable by any suitable means in the direction of the axis of rotation of the cutter head as by any suitable slow driving means. An example of such a construction is shown and described later in connection with Figures 14 and 15. It will be obvious therefrom that simultaneously with the slow advance of this guiding curve in the direction of the axis of rotation of the cutter head a gradual penetration of the tool cutters into the depth of the tooth spaces to be cut can take place in the direction of the cutting edges themselves or in the direction of the inclined tooth flanks of these tooth spaces.

Such a feed motion has special signification in those cases where it is a question of trapezoidal tooth spaces or rectilinear tooth flanks without rolling motion by direct deep shaping. Such a cutting operation of a trapezoidal tooth space without rolling motion is frequently used in the shaping of tooth spaces out of solid wheel blanks. Further it is of great signification, in view of improvements and simplifications of the helical gear cutting methods of recent times, for the production of gearing of high ratio, in which of two co-operating gear wheels the greater without any rolling motion is provided with rectilinear flank tooth formation by trapezoidal cross-sectional formation of the tooth spaces, whilst the associated smaller counter wheel opposite to the cutter head is no longer moved opposite to a flat toothed formation but opposite to a generating wheel which corresponds correctly to the first mentioned larger wheel with the trapezoidal cross-sectional tooth spaces. To facilitate an explanation of the difference between the methods heretofore mentioned and generally known as purely Bilgram methods and the more recent rolling methods the usual rolling motion of a bevel pinion 33 on the corresponding absolute crown wheel 34 is shown in Figure 8, which crown wheel is represented by the tool holder. This Bilgram rolling motion consists in the rolling of the bevel pinion on an absolute crown wheel (tool) or in a simultaneous rotation of this pinion about the axis XXI and about the axis YYI of the corresponding crown wheel, both axes of rotation being inclined to one another at an angle equal to half the conical angle. Figure 9 shows the simplest rolling motion in which the same bevel pinion 33 is no longer rolled in a plane but on the conical basic wheel or bevel wheel 35. This basic bevel wheel 35 corresponds exactly to the counter wheel associated with the bevel pinion 33 and is represented by the same tool motion as in the absolute crown wheel or basic wheel in the Bilgram method. The axes for the rolling motion are therefore in the case of a bevel wheel of 90° axial angle always at right angles to one another. The rolling motion in the formation of the teeth of the bevel pinion 33 consists in this case of a simultaneous rotation of the pinion about its own axis XXL and the axis ZZI (perpendicular thereto) of the pitch cone of the counter bevel wheel. The interposition of a basic wheel in this simplified method takes place exactly according to the Bilgram method. As the generation of the tooth flanks is effected directly on the counter bevel wheel imagined as provided with trapezoidal toothed spaces the latter itself need only be provided with these trapezoidal toothed spaces, and this can now be effected by simple working of the toothed spaces by means of rectilinear flank steel cutters, without any rolling motion. If mention is made in the introduction to the present specification to rolling motion with the associated basic teeth all of the matter there referred to and in the present specification applies just as well to such simplified arrangements in which the basic teeth are replaced by the truncated conical basic teeth of the counter wheel.

If the operation can be effected as hitherto usual by penetration of the steel cutters in the direction of depth of the toothed spaces by the gradual approach of the wheel blank to the cutter head there arises, in consequence of the trapezoidal or wedge shaped form of the toothed spaces, cuttings of an undesirable width.

Figure 10 shows diagrammatically several successive sections of cuts made in the shaping of a trapezoidal tooth space wherein, as usual, several trapezoidal steel cutters are arranged on the cutter head in such manner that they cut alternately with the right and left or outer and inner edges. The depth of the toothed spaces thus arising are proportionately very wide and therefore extraordinarily thin shavings are produced under high pressure and stress on the machine and on the cutter so that the power needed is excessive in proportion to the actual cross section of the cutting removed.

In contradistinction to the above Figure 11 illustrates the penetration of the cutters in the direction of their inclined cutting edges by corresponding displacement of them on the cutter head in the direction of the conical generator. In this case the cutting is chiefly effected by the points of the cutters and only very slightly at the sides and so that cuttings of considerably favorable cross section and of considerably less width are removed. The maximum width of the shavings or cuttings is in this case independent of the breadth of the tooth space and is uninfluenced by the depth of the tooth space.

From Figure 11 it will be obvious that cutters on the cutter head cut alternately outwardly and inwardly, or to the right and left, and consequently alternately on the oppositely inclined flanks to which they are relatively displaced in corresponding directions.

Figure 12 shows diagrammatically an arrangement which exists when a middle cutter is introduced, between an external and an internal cutting tool, which middle cutter cuts simultaneously on both flanks and on the bottom and consequently is not displaced parallel to the side flanks but perpendicular to the tooth bottom or in a direction symmetrical with the trapezoidal cross-section. In such an arrangement the cutting tools on the cutter head acting in rotation, viz, the external cutter, the rectilinear middle cutter, the inclined side cutter, etc., give a particularly finely divided cutting. Each trapezoidal cutter can be made thin without any danger of chattering. The main material of the tooth space is removed by the middle cutter, which never directly touches the finished tooth flanks. The side cutters which machine the actual tooth flanks are, therefore, considerably preserved and thus produce particularly clean cuts. Cutter heads having cutters which operate and are fed successively, the first at an angle to the outer flanks, the second straight in the direction of the centre line of the trapezoidal outline and the third at an angle to the direction of the inner flanks, thus distribute the cut to the best advantage, entail the least strain on the machine and of the two side cutting edges, and thus effect the greatest efficiency and cleanness of cut when directly cutting the tooth spaces of trapezoidal section, or with simple, straight tooth flanks.

It was assumed above that with a circular movement of the cutters or simple rotary movement of the cutter head simple helical arcuate tooth flanks are obtained. This is the case when the wheel blank itself disregarding the rolling movement, remains stationary relatively to the cutter during the cutting operation. Machines are, however, known in which the wheel blank is not stationary during the cutting operation but continually rotates in positive connection with the movement of the cutter head. (For straight line cutting movement see Monneret-method, for circular cutting movement Böttcher-method D. R. P. 312,859, second example of construction.) With a circular movement of the cutter head tooth flanks are formed, which are no longer curved along simple curves but along cyclic curves. In this case the cutting angle of the tool cutting edge varies, whilst describing this curve, relatively to the path of this cyclic curve. In order to obtain constant cutting angles and correct tooth shapes in spite of this, it is, therefore, necessary to turn the cutting tools to and fro, whilst describing these cyclic flank lines on the cutter head in such a manner that constant cutting angles are maintained in relation to each point of the tooth flank lines described.

For this purpose the shanks 21, 22 of the cutters in Figures 5, 6, 7, are locked against axial movement, but are otherwise mounted freely rotatable about their axes in separate bushes 23, 24. These, as stated above, are mounted axially movable in the cutter head. The shanks 21, 22, are provided at their rear ends with separate pawls 29, 30, which slide in corresponding templates 31, 32, rigidly provided on the bearing body and according to their shape permit of any suitable to and fro oscillation of the cutter shanks 21, 22, during the rotation of the cutter heads, for the purpose of continually obtaining a constant cutting angle for every suitably curved tooth shape. As the axis about which the oscillatory rotation occurs coincides with the axes of the cutter shanks, and their axes, as previously stated, are in exact alignment with the inclined cutting edges, only the cutting angle is varied by this oscillatory movement, but not the position of the cutting edges themselves relatively to the cutter heads. Consequently, the generated tapering surface remains entirely unaffected by this oscillatory movement so that no source of error can be introduced into the teeth produced, even inaccuracies in the templates 31, 32, do not produce errors in the generated conical surface and consequently in the generated teeth, but only affect the more or less accurate maintenance of the constant cutting angle, as already stated. All the previously mentioned conditions apply not only to arcuate tooth flanks but equally well to such as are curved according to any other curve. Hitherto it was assumed that the cutter head carried out a simple rotary movement, that its axis, therefore, irrespective of this rotary movement remained stationary in space during the cutting operation. It is now possible, by various auxiliary movements, to move the axis of the rotary cutter head in such a manner that the cutting edges no longer describe arcuate lines, but also curves deviating more or less therefrom. It will be understood that all that has been stated above also applies to this complex case of the cutter movement.

Such an auxiliary movement or orbital movement of the axis of the cutter head during its rotary movement about this axis can be produced in various ways by templates or crank mechanism. Thus, the auxiliary movement itself may again be a simple circular movement or an oscillatory movement on a straight line or on an arc derived from this. If the first case be adopted for the following example of construction, namely, a simple circular movement of the axis of the cutter head around a second axis in space as the auxiliary movement during its rotation about its own axis, there is obtained a combination of the cutting movement from two circular movements taking place simultaneously, into a movement along a cyclic curve. As the cutter head simultaneously rotates about its axis, whilst its axis moves in a circle about a second axis it carries out a so-called planet movement by means of which, for example, herringbone tooth shapes are capable of being produced for cylindrical and bevel wheels.

For cutting such tooth curves, which substantially deviate from an arc, the movability of the separate cutters on the cutter head described in the introduction for the simple arcuate movement is of very considerable importance and must, therefore, not be omitted. A form of construction of a cutter head, suitable for practical tooth cutting, with an orbital movement is shown by way of example in Figure 13 (front elevation), Figure 14 (side section) and Figure 15 (side section along the plane $Y-Y^1$).

Also this form of construction is provided with a cutter head for the cutters, which rotates about its own axis, whilst its axis simultaneously describes a circular or orbital movement about a second axis. The first rotation of the cutter head takes place in a supporting casing. The second circular or orbital movement of the cutter head about a second axis is produced by a circular oscillatory movement of the entire supporting casing together with the cutter head mounted therein. For this purpose the entire casing is mounted in a similar manner to a coupling rod on the crank pins of two parallel crank shafts so that every point on the coupling member i. e. on the casing, and thus also the axis of the cutter head mounted therein, describes a circular path corresponding to the circular paths of the crank pins. The orbital movement is, therefore, produced by two parallel crank shafts with the casing forming a coupling member in which the cutter head is rotatively mounted. In relation to the cyclic curves described by the cutters and the herringbone teeth thus outlined no fundamental alteration is produced by this construction in comparison with the method of operation of the arrangement described above.

The supporting casing 47 or coupling member is mounted on the crank pins 49, 50, of two parallel crank shafts 51, 52, which rotate simultaneously and in unison so as to effect a circular oscillation corresponding to that of each crank pin.

A cutter head 53 is rotatively mounted in ball bearings 54, 55, in the supporting casing 47, directly or with the interposition of a rear closing flange 56. The rear end of the cutter head 53 is connected to a driving toothed wheel 57 which meshes with two toothed wheels 58, 59, on the crank pins 49, 50. When the crank shaft 52 is driven by the toothed wheel 60 the cutter head 53 and the crank shaft 51 will rotate positively together by reason of the toothed wheels 59, 57, 58. As both crank shafts 51, 52, in this case rotate at the same speed the axis of the cutter head 53 will thus simultaneously with the whole casing 47 make oscillations in a circle of a diameter equal to that of the crank circle, namely, the desired orbital movement. Two diametrically oppositely disposed cutter holders 61, 62 are mounted in the cutter head 53, so that they can freely rotate and move axially therein. The cutter holders 61, 62, are inclined to the axis of rotation of the cutter head at an angle equal to the flank angle of the master teeth to be developed. These cutter holders 61, 62, have suitable bores for the reception of the shanks of right hand and left hand or outer and inner side cutters 63, 64. These bores are so arranged that when the cutters are secured in the holders 61, 62, the straight cutting edges of the side cutters 63, 64, coincide accurately with the axes of rotation of the holders.

Figure 15:
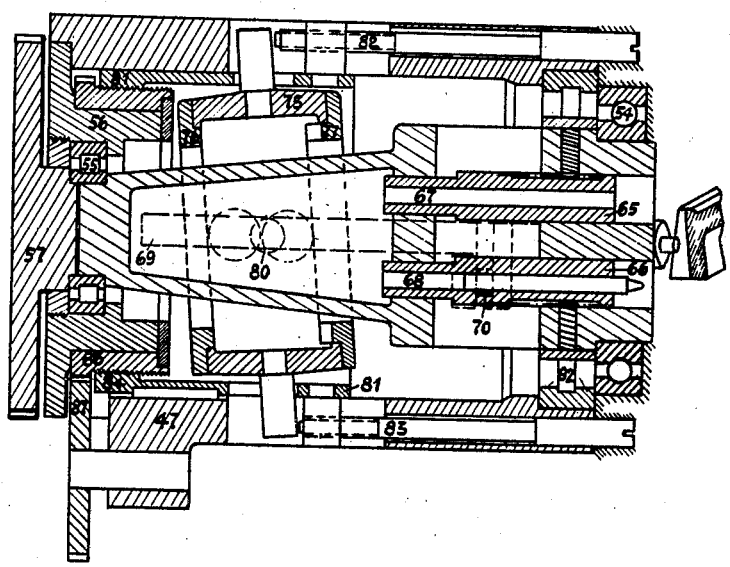

In a similar manner the cutter head 53 is provided with cutter holders 65, 66, for the middle cutters 67, 68. They are oppositely disposed to each other and relatively displaced to the side cutters by 90° and at equal distances from the axis of rotation of the cutter head 53. The axes of these cutter holders 65, 66, however, (see direction of feed of the middle cutter in Figure 12) are not inclined according to the flank angle of the basic tooth to be developed, but are arranged parallel to the axis of the cutter head 53 (Figure 15). They are also rotatively mounted and axially movable in the cutter head and are provided with suitable bores 67, 68, for the reception of the shanks of suitable middle cutters. These bores 67, 68, are so arranged that the centre line of the trapezoidal cutting outline of the middle cutters coincides with the axis of rotation of their holders 65, 66.

In order to enable the axial movement of all the cutter holders to be effected by a common cam (see also the previously described axial movement of the bush 21/22 by the cams 27/28 in Figures 5 to 7), the following arrangement is provided:—

A separate rail 69 is arranged adjacent to each cutter holder, the rails being guided in grooves in the cutter head in a direction parallel to its axis of rotation. A projection provided at the front end of each rail engages with an annular groove 70 of the respective cutter holder, so that the rails 69 and cutter holders are compelled to move longitudinally together. Whereas the four cutter holders are located in an irregular manner, some at an angle, some parallel to the axis of the cutter head, the four corresponding rails 69 are arranged parallel to the axis of the cutter head and concentrically thereto. Each rail 69 carries on fixed bolts 71/72 two guide rollers 73/74 which are guided between the edges of two end cams 76/77 secured together to form a casing 75. The end cams 76/77 simultaneously control the axial movement of all the cutter holders by means of the rails 69. They may be of any desired shape; in the form shown, they are smooth circular surfaces, each having a single rise 78 as shown in Figure 14. Whilst passing this rise 78 the separate cutter holders are completely drawn back in an axial direction out of the wheel blank to be cut in order, that on the continued rotation of the cutter head the cutters do not cut into the face of the blank on their return part of their path across the same and injure the partly formed teeth.

The cam casing 75 is mounted on trunnions 79/80 in a bush 81 so as to be freely rotatable about an axis at right angles to the axis of rotation of the wheel blank. The inclined position of the cam casing 75 can be adjusted and it can be clamped at any suitable angle by means of set screws 82/83 (Figure 15). Whilst this inclined positioning is not generally used in connection with cylindrical wheels, it produces a more or less rapid forward and backward movement of the rails 69 and the cutter holders connected therewith during the cut (see tooth bottom lines F—F$^1$ on the wheel blank to be toothed in Figure 15), when cutting bevel wheels having teeth which are to be reduced in height towards the apex of the pitch cone.

The cams 76/77 are to be adjusted and used in this manner for all bottom lines.

The bush 81 is provided with an internal thread 84 and is axially movable in a recess in the cutter head 53 parallel to the axis of rotation thereof. Its internal thread engages in a corresponding external thread of a feed bush 85 which is prevented from axial movement, but is mounted so as to be freely rotatable on the closing flange 56. This feed bush 85 is provided with a toothed flange 86 which can be rotated by a toothed wheel 87. The toothed wheel 87 (Figure 15) is positively connected, in a manner not further illustrated, with the feed gear of the machine.

When the feed bush 85 turns, the bush 81 engaging therewith and suitably prevented from rotation, moves slowly forward in the supporting casing 47 in the direction of its axis. It thus moves with it the cam casing 75, the rails 69 and the cutter holders engaged therewith. This axial depth feed of the cutter head holders in the cutter naturally only takes place in the direction of the depth of the tooth space so long as the trapezoidal tooth spaces are to be cut without rolling movement (see also the constructions in Figures 11, 12). When operating according to the rolling method such a depth feed is naturally unnecessary and the adjustability of the feed bush 85 serves in this case only for the single setting of the cutter holders and the cutters in an axial direction.

For controlling the oscillatory rotary movement of the cutter holders about their axes for the purpose of maintaining a constant cutting angle for each point of a suitable tooth flank curve, a portion of the periphery of each cutter holder is provided with spur wheel teeth 88 which gear with racks 89. The teeth of the toothed portion 88 of each cutter holder are made so wide that they permit of the full axial movement of the cutter holder without the interference with their engagement with the racks 89, which do not partake of the axial movement. Each of the four racks 89 is longitudinally movable in suitable guide grooves in the cutter head and carries at each end guide rollers 90/91. All the guide rollers 90/91 run around an inner template 92 which is mounted in the oscillatory supporting casing 47 concentrically to the axis of the cutter head.

All four racks 89, therefore, carry out straight line movements during the rotation of the cutter head and transmit this by reason of their engagement with the teeth 88 as suitable oscillatory rotary movements of the cutter holders about their axes. With suitably shaped templates 92 it is possible to so fix this oscillatory movement, that during the passage over each point of the herringbone tooth flank curve a constant cutting angle is maintained between the cutting edge of the cutter and the tooth flank.

Figure 13:
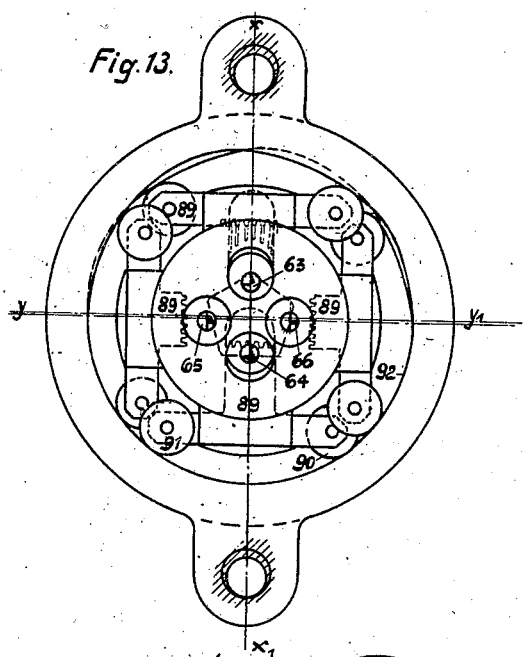
Fig. 13 is a front elevation of a practical embodiment of the machine.

In this manner the cutter head shown in Figures 13 to 15 incorporates all the principles for the production of curved tooth shapes set out above as essential fundamentals for the accurate generation thereof. As these principles apply in the same manner for all curved tooth flank-lines of different type, it appears unnecessary for the subject of the invention, whether the casing 47 carries out the circular oscillatory movement shown in a similar way to a coupling member or whether this circular auxiliary movement is produced, for example, by an auxiliary movement of suitable stroke and frequency on a straight guide or on an arc.

If every auxiliary movement of the supporting casing is prevented by mounting it rigidly on machine parts instead of on crank shafts there is again obtained the earlier cutter head which simply carries out circular movements on its own axis, which otherwise is stationary in space. In this case the auxiliary movement can be transmitted with the same effect to the wheel blank as it is immaterial for the relative movement between the cutting edge of the cutter and the wheel blank, which part actually carries out the movement. Then the wheel blank together with its entire supporting means will carry out a suitable circular or oscillatory swinging movement or will suitably oscillate to and fro about its own axis during the cutting. In each case the requirements on the cutter holder itself remain unaffected by such a distribution of the movements and there are produced in the wheel blank, under otherwise similar conditions, the required herringbone teeth.

The continuous rotary movement of the cutter head in the supporting casing may also be replaced by a suitable circular to and fro oscillatory movement, as is known in connection with circular curved teeth. In this case the cutter will no longer describe the entire polygonal curve, but only a portion thereof in the range of the tooth flank to be produced.

In order to effect this the driving members of the cutter head must have their continuous rotary movements converted into oscillatory rotary movements. The number of cutter holders is in strict relation to the number of corners of the polygon described. In a similar manner to the latter the number of cutter holders, as also their distribution in outer, inner and middle tools, can be suitably selected for different methods of operation and tooth shapes. In combination therewith the extent of eccentricity of the crank pins or the diameter of the circle for the auxiliary movement in relation to the diameter described by the cutters on the cutter head, as also the transmission ratio between the toothed wheels 57/58/59 can be made of any desired value as determining the shape of the tooth curve which is formed.

As it is important that later co-operating wheel blanks are curved on the partial circle according to exactly the same tooth flank curve, it is possible, for example, firstly to finish completely all the concave curved tooth flanks with a cutter in an outer cutter holder only, then to turn the wheel body through a half tooth pitch and completely finish all the convex tooth flanks with only a cutter in an inner cutter holder. If care is taken that the outer cutting edges of the first cutter holder and the inner cutting edges of the second cutter holder have their points touching the partial circle of the tooth which is being formed at exactly the same distance from the axis of rotation of the cutter head, the teeth produced will have concave and convex tooth flanks of exactly the same tooth flank curves.

If in the interest of treating simultaneously adjacent tooth flanks there is used a cutter head of the character described with alternately outside and inside cutters, then there is obtained for concave and convex, simultaneously treated adjacent tooth flanks, a flank line path along curves which are no longer the same, but are arranged parallel one within the other in the same manner as concentric arcs, and, therefore, possess different radii of curvature. If in a wheel the convex tooth flank is curved according to a curve of larger radius of curvature, then care must be taken that in the counter wheel the concave tooth flank is formed in the reverse manner according to the same curve of larger radius of curvature, so that later on when the wheels co-operate with one another the convex and concave toothed flanks of the different wheels bearing upon one another co-operate in pairs with the same tooth flank path.

The cutter head shown in Figures 13 to 15 is provided with an arrangement of side and middle cutter holders, which correspond with the continuous method of operation for herringbone wheels to be hereinafter described.

It has been stated above that rolling machines, both with straight line and with a circular cutting movement are known, in which the wheel blank, in addition to the rolling movement, carries out, in positive connection with the cutter movement, a uniform, continuous rotary movement about its own axis (continuous dividing movement) during the whole period of operation. In this case the cutting edges of cutters which successively enter the wheel blank and thus produce the cut, do not engage with the same tooth flanks, but by reason of the continuous further rotation of the wheel blank during the cutting, always with successive tooth flanks. The latter are all being cut, further developed and finished during a common, suitably slow, rolling movement between the cutter and the wheel blank without any reducing partial movement being necessary, for the novel cutter head described in connection with Figures 13 to 15, which has a cutting movement along a polygonal curve instead of the simple rotary movements, such an additional continuous rotary movement of the wheel blank with a uniform angular speed can be used without difficulties. If, for example, the continuous rotary movement of the wheel blank is so determined that a complete revolution of the cutter head corresponds with a partial revolution of a wheel blank through one tooth pitch the outer and inner cutters 63/64, which in Figures 13 and 14 are exactly opposite to one another and which alternately after each half revolution of the cutter head produce a cut will always come into engagement continually with all the teeth of the wheel blank of successive concave and convex tooth flanks which are spaced apart by a half tooth pitch. In this connection the side cutters 63/64 must always be so adjusted by means of suitable axial adjustment of the feed bush 85, so that the points on a level with the pitch circle of the teeth to be cut have on both cutting edges the same distance from the axis of rotation of the cutter head and thus also generate exactly the same concave and convex tooth flank line. Only one of the cutter holders 66/67 for the middle cutters, namely, the one which meets the middle of the tooth space, whilst having regard to the direction of rotation and the sequence of cutting between the side cutters, must be provided with a middle cutter, whilst the other middle cutter holder runs idle. If the cut of the middle cutter is effected between the cut of the outer and inner side cutters then, as shown diagrammatically in Figure 12, it will always remove the material from the middle of the tooth space and thus remove the load from the side cutters and preserve them for the cutting of the actual tooth flank. A middle cutter simultaneously fitted in the second middle cutter holder would, on the continued movement of the wheel blank, directly meet the middle of the material of the tooth which remains. The deterioration of the tooth flank lines caused by the continued rotation of the wheel blank is unimportant in practice. It has no effect whatever on the correct fitting together of the tooth flanks, as this deterioration occurs to exactly the same extent for co-operating tooth flanks. In order to balance its effect on the cutting angle this deterioration may be considered at the beginning when shaping the template 92.

For the better elucidation of the formation of the tooth flank lines of a continuous, looplike curve of somewhat diverted shape, Figure 16, shows diagrammatically a representation of the position of the path of the cutters relatively to the cylindrical wheel blank or more accurately to the development of the plane or corresponding rack teeth, the latter must be assumed developed by reason of the continuous rotary movement of the wheel blank in a uniform straight line, assumed in the direction of the arrow in order to enable the generation of the tooth curve, formed by the co-operation of the cutting and rack movement, to be examined.

The two cutting edges DE correspond with the side cutters 63/64 in Figures 13 to 15. Cutting edge F corresponds with the middle cutter of the same figure. All cutting edges DEF are moved in the manner above described by the cutter head along the cyclic polygon curve I shown in dotted lines. For this purpose they are so arranged on the cutter head that the inner cutting edge of D described with its point touching the pitch circle of the tooth to be cut exactly the same polygon curve as the outer cutting edge of E. A complete revolution of the cutter head or a complete passage of the polygon curve corresponds with a straight line forward movement of the rack Z through a tooth pitch $t$. The cutter D describes relatively to the rack Z the chain dotted loop like curve II deviating from the polygon curve. This relative polygonal loop curve can be used in a similar manner as the polygon curve actually described by the cutting edge for forming teeth.

As shown in Figure 16 D intersects with its inwardly disposed cutting edge the convex tooth flank $a$—$a$ in the rack; E touches with its outwardly disposed cutting edge the adjacent concave tooth flank $b$—$b$ of the same tooth space, as the rack has moved forwards half a tooth pitch during a half revolution of the tool holder.

after the next half revolution D touches the convex tooth flank c—c and after a further half revolution E the concave tooth flank d—d of the adjacent tooth space and so forth. All the concave and convex tooth flanks are, therefore, formed according to exactly the same loop curve. As the middle tool F effects a cut exactly between D and E it strikes accurately into the middle line of the tooth space but never touches a flank surface but removes the material from the tooth space. In this manner the cutting of all the tooth spaces is started simultaneously and by reason of the slow rolling movement effected in the known manner are gradually deepened and finally finished simultaneously.

Figure 17:
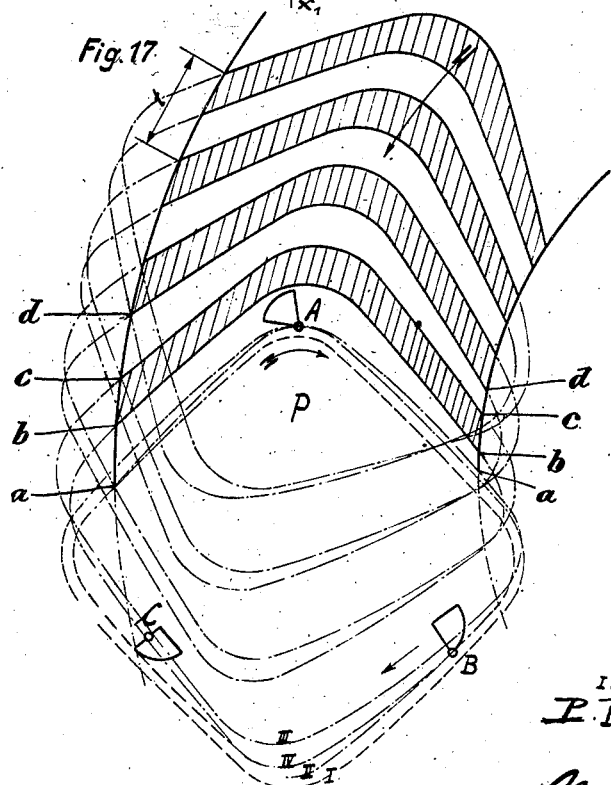

Exactly the same is shown in Figure 17 for cutting teeth in bevel wheels. In this example of construction, however, contrary to Figure 16, there are shown teeth which are built up, on a cyclic square curve.

The cutter head used for the production of such square curves is only provided with three cutter holders, one for the side cutters A and B and between them one for the middle cutter C. Otherwise the cutters A, B, C move in a similar manner, in the square curve, as in that in Figure 15 in the corresponding polygon curve. Instead of the straight line movement of the rack shown in Figure 16, through one pitch, during one revolution of the cutter head there is effected a rotation through a tooth pitch $t$ of the basic bevel wheel P shown developed in a plane. As by dividing the tool into three the cutter B begins the cut first, after the wheel has been turned through ⅔ of a pitch, tooth spaces would be formed which have a ⅔ pitch.

In order in this case also to obtain teeth and tooth spaces of the same pitch, the cutters are, therefore, no longer so adjusted in the cutter head that their points being on the level of the pitch circle of the teeth to be cut have on both cutting edges the same distance from the axis of rotation of the cutter head. They are intentionally so disposed that the inner cutter A describes a curve of larger diameter than the outer side cutter B. By a suitable selection of the difference for these two curves I and II it becomes possible, in spite of dividing the tool into three to obtain teeth of any suitable size. In order to enable exactly the same shape of curve to be formed with certainty for susequently co-operating concave and convex curved tooth flanks it is necessary, when providing the counter wheel with teeth to proceed in exactly the reverse manner and to cause the inner side cutter A to describe the smaller curve and the outer side cutter B the larger curve. If the loop curves III and IV according to which all the concave and convex flanks appear curved are carried in exactly the opposite manner for co-operating toothed wheels, then concave and convex tooth flanks of different wheels for co-operation in pairs would fit one another completely in spite of different concave and convex flanks in the same wheel.

I claim:

1. A method of cutting helical, spiral, double helical, herringbone or other cylindrical and bevel gears having curved teeth, consisting in imparting to the cutter edge which generates the tooth blank a cutting movement in a plane parallel to that of imaginary master teeth and in addition to said movement imparting a component movement to said cutting edge at right angles to said plane for the purpose of influencing the depth of the tooth spaces, said component movement of the cutter being relative to the cutter head and in the longitudinal direction of said edge when variable tooth space depths with correctly shaped teeth are to be cut.

2. A method of gear cutting according to claim 1 wherein during the cutting movement of the cutter head the cutter is reciprocatingly rotated upon the cutter head about an axis coincident with its cutting edge, whereby a constant cutting angle is maintained during the entire cutting movement.

3. In a method of gear cutting according to claim 1 characterized by imparting a circular movement to the cutter head.

4. A method of gear cutting according to claim 1 wherein an auxiliary movement is imparted to the cutter head, to divert it from its circular path of movement into a resultant path of movement corresponding to a polygon with rounded corners.

5. A method of gear cutting according to claim 1, wherein an auxiliary circular movement is imparted to the cutter head.

6. A method of gear cutting according to claim 1 wherein the cutter edge is returned longitudinally after the completion of each cut.

7. A method of gear cutting to claim 1 wherein a forward feeding movement, without any generating movement, is imparted to the cutter in the direction of its cutting edge, to become effective during the generating movement.

8. Apparatus for cutting helical, spiral, double helical (herringbone) or other cylindrical and bevel wheels with curved teeth comprising a cutter head, a cutter holder mounted to rotate and move axially in said cutter head members for guiding said cutter holder longitudinally, a cutter mounted in said cutter holder with its cutting edge lying parallel to said guide members and in alignment with the rotational axis of said cutter holder, and means for imparting a rotary movement and an axial movement to said cutter holder.

9. Apparatus for cutting helical, spiral, double helical (herringbone) or other cylindrical and bevel wheels with curved teeth comprising a cutter head, a cylindrical cutter holder mounted to rotate and move axially in said cutter head, a cutter mounted in said cutter holder with its cutting edge in alignment with the rotational axis of said cutter holder and at an angle to imaginary master teeth, and means for imparting a rotary movement and an axial movement to said cutter holder.

10. Apparatus for cutting helical, spiral, double helical (herringbone) or other cylindrical and bevel wheels with curved teeth comprising a cutter head, a cutter holder mounted to rotate and move axially in said cutter head, a cutter mounted in said cutter holder with its cutting edge in alignment with the rotational axis of said cutter holder, means for imparting a rotary movement to said cutter holder, means for imparting an axial movement to said cutter holder, said means for imparting said axial movement to said cutter holder comprising a rail guided in said cutter head at right angles to the plane of imaginary master teeth, and engaging in an annular groove formed in said cutter holder and a cam for controlling said rail.

11. Apparatus for cutting helical, spiral, double helical (herringbone) or other cylindrical and bevel wheels with curved teeth comprising a cutter head, a cutter holder mounted to rotate and move axially in said cutter head, a cutter mounted in said cutter holder with its cutting edge in alignment with the rotational axis of said cutter holder, means for imparting a rotary movement to said cutter holder, means for imparting an axial movement to said cutter holder, said means for imparting said rotary movement to said cutter holder, comprising a rack guided linearly in said cutter head in parallel relation to the plane of an imaginary master tooth, engaging with teeth formed on the cutter holder, and a template for controlling said rack.

12. Apparatus for cutting helical, spiral, double helical (herringbone) or other cylindrical and bevel wheels with curved teeth comprising a cutter head, a plurality of cutter holders mounted in said cutter head to rotate and move axially in said cutter head, a cutter mounted in each cutter holder, means for imparting a rotary movement to each cutter holder, means for imparting an axial movement to each cutter holder, a cam for controlling said axial movement of all of said cutter holders, and a template for controlling said rotary movement of all of said cutter holders.

13. In apparatus for cutting helical, spiral, double helical (herringbone) or other cylindrical and bevel wheels with curved teeth a rotary cutter head, an oscillatory supporting member therefor and cranks of the same eccentricity for imparting an oscillatory movement to said supporting member.

14. Apparatus for cutting helical, spiral, double helical (herringbone) or other cylindrical and bevel wheels with curved teeth comprising a cutter head, a cutter holder mounted to rotate and move axially in said cutter head, a cutter mounted in said cutter holder with its cutting edge in alignment with the rotational axis of said cutter holder, means for imparting a rotary movement to said cutter holder, means for imparting an axial movement to said cutter holder, said means for imparting said axial movement to said cutter holder comprising a rail guided in said cutter head at right angles to the plane of imaginary master teeth, and engaging in an annular groove formed in said cutter holder and a controlling member for said rail, said controlling member comprising a circular ring mounted for adjustment about a diameter thereof, said ring having a rise to impart a return movement to said cutter on completion of each cut.

15. Apparatus for cutting helical, spiral, double helical, herringbone or other cylindrical and bevel wheels having curved teeth including a cutter head, a cutter holder mounted to rotate and move axially in said cutter head, a cutter mounted in said cutter holder, and means for imparting a rotary movement and an axial movement to said cutter holder, the controlling surface for the longitudinal movement of the cutter holder being movable by hand or mechanically in a direction at right angles to the plane of the imaginary master teeth so as to effect feed movement.

16. In a machine for cutting curved teeth for spur and bevel gears, including a cutter head, a cutter moved in a curved path in a plane tangent to the pitch line of the blank, said cutter head including toolholders rotatable and slidable in the cutter head, with their axes excentric and inclined towards the axis of the cutter head corresponding to the angle of the involute of the basic tooth in such a manner as to coincide with the respective cutting edges of the tools fixed upon the toolholders.

17. In a machine for cutting curved teeth for spur and bevel gears, including a cutter head, a cutter moved in a curved path in a plane tangent to the pitch line of the blank, said cutter head including toolholders rotatable and slidable in the cutter head, with their axes excentric and inclined towards the axis of the cutter head corresponding to the angle of the involute of the basic tooth in such a manner as to coincide with the respective cutting edges of the tools fixed upon the toolholders, and means for reciprocating the toolholders about their axes whereby to maintain a constant cutting angle during the entire cutting movement.

18. In a machine for cutting curved teeth for spur and bevel gears, including a cutter head, a cutter moved in a curved path in a plane tangent to the pitch line of the blank, said cutter head including toolholders rotatable and slidable in the cutter head, with their axes excentric and inclined towards the axis of the cutter head corresponding to the angle of the involute of the basic tooth in such a manner as to coincide with the respective cutting edges of the tools fixed upon the toolholders, means for reciprocating the toolholders about their axes whereby to maintain a constant cutting angle during the entire cutting movement, and means for automatically withdrawing the toolholders from the blank after the completion of each cut by a longitudinal sliding motion of the toolholders in the cutter head.

19. In a machine for cutting curved teeth for spur and bevel gears, including a cutter head, a cutter moved in a curved path in a plane tangent to the pitch line of the blank, said cutter head including toolholders rotatable and slidable in the cutter head, with their axes excentric and inclined towards the axis of the cutter head corresponding to the angle of the involute of the basic tooth in such a manner as to coincide with the respective cutting edges of the tools fixed upon the toolholders, means for reciprocating the toolholders about their axes whereby to maintain a constant cutting angle during the entire cutting movement, means for automatically withdrawing the toolholder from the blank after the completion of each cut by a longitudinal sliding motion of the toolholders in the cutter head, and means for reciprocating the tool holders during each cut longitudinally to the direction of their axes to produce a tooth root of required form or teeth of varying depth.

20. A machine as claimed in claim 19, characterized in that the cutting path of the cutting edge is circular.

21. A machine as claimed in claim 19, characterized in that the shape of the path of the cutting edge may be changed from a circular to a curve of a polygon with rounded corners by the addition of an auxiliary movement.

22. A machine as claimed in claim 19, characterized in that the shape of the path of the cutting edge may be changed from a circular to a curve of a polygon with rounded corners by the addition of an auxiliary movement, said auxiliary movement being also a circular movement.

23. A method of cutting helical, spiral, double helical, herringbone or other cylindrical and bevel gears having curved teeth by a relative rolling motion between the tool and blank consisting in imparting a cutting movement in a plane parallel to that of imaginary master teeth and in addition to said movement imparting a component movement to said cutting edge at right angles to said plane for the purpose of influencing the depth of the tooth spaces, said component movement of the cutter being relative to the cutter head and in the longitudinal direction of said edge when variable tooth space depths with correctly shaped teeth are to be cut.

In testimony whereof I have signed my name to this specification.

PAUL BÖTTCHER, Jr.